(12) United States Patent
Maslov et al.

(10) Patent No.: US 6,919,700 B2
(45) Date of Patent: *Jul. 19, 2005

(54) ADAPTIVE CONTROL OF MOTOR STATOR CURRENT WAVEFORM PROFILES

(75) Inventors: Boris A. Maslov, Reston, VA (US); Matthew G. Feemster, Severna Park, MD (US); Guohui Yuan, Greenbelt, MD (US)

(73) Assignee: Wavecrest Laboratories, LLC, Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/353,083

(22) Filed: Jan. 29, 2003

(65) Prior Publication Data

US 2004/0145323 A1 Jul. 29, 2004

(51) Int. Cl.[7] .............................................. H02P 29/00
(52) U.S. Cl. ...................... 318/439; 318/138; 318/254; 318/724; 310/259; 310/216
(58) Field of Search ................................. 318/138, 254, 318/439, 720, 721–724, 162–164, 811, 599; 388/904; 310/259, 216, 156.12, 156.13, 218, 74

(56) References Cited

U.S. PATENT DOCUMENTS

| | | | | |
|---|---|---|---|---|
| 4,670,698 A | * | 6/1987 | Fulton et al. ................ 318/802 |
| 5,034,675 A | | 7/1991 | Nerowski et al. | |
| 5,038,090 A | * | 8/1991 | Kawabata et al. .......... 318/721 |
| 5,258,697 A | * | 11/1993 | Ford et al. ................... 318/498 |
| 5,289,890 A | | 3/1994 | Toyoda et al. | |
| 5,365,137 A | | 11/1994 | Richardson et al. | |
| 5,569,994 A | * | 10/1996 | Taylor et al. ................ 318/700 |
| 5,583,411 A | * | 12/1996 | Kusano et al. .............. 318/719 |
| 5,834,918 A | * | 11/1998 | Taylor et al. ................ 318/601 |
| 6,002,234 A | * | 12/1999 | Ohm et al. .................. 318/729 |
| 6,034,493 A | * | 3/2000 | Boyd et al. .................. 318/254 |
| 6,091,216 A | * | 7/2000 | Takahashi et al. .......... 318/254 |
| 6,242,873 B1 | * | 6/2001 | Drozdz et al. ............... 318/139 |
| 6,373,211 B1 | * | 4/2002 | Henry et al. ................. 318/432 |
| 6,384,496 B1 | * | 5/2002 | Pyntikov et al. .......... 310/68 B |
| 6,465,975 B1 | * | 10/2002 | Naidu ......................... 318/139 |
| 6,472,842 B1 | * | 10/2002 | Ehsani ........................ 318/701 |
| 6,694,287 B2 | * | 2/2004 | Mir et al. .................... 318/565 |
| 2003/0218444 A1 | * | 11/2003 | Marcinkiewicz et al. ... 318/727 |

FOREIGN PATENT DOCUMENTS

| | | |
|---|---|---|
| DE | 195 03 492 A1 | 8/1998 |
| DE | 197 04 576 A1 | 8/1998 |
| EP | 0 006 669 A1 | 1/1980 |
| EP | 0 866 547 A1 | 9/1998 |
| WO | WO 90/11641 A | 10/1990 |
| WO | WO 90/11641 | 10/1990 |

* cited by examiner

*Primary Examiner*—David Martin
*Assistant Examiner*—Eduardo Colon Santana
(74) *Attorney, Agent, or Firm*—McDermott Will & Emery LLP

(57) ABSTRACT

Subject to user or system selection, one of the motor control schemes is accessed from the memory by a controller for implementation. The controller generates control signals that are applied to energization circuitry for supplying current to the phase windings with a particular current waveform profile in accordance with the selected motor control scheme. The controller has an input terminal for receiving a user initiated torque command signal representing a desired motor torque. Each motor control scheme provides motor driving current that corresponds to torque command signals received at the controller input terminal.

19 Claims, 4 Drawing Sheets

ADAPTIVE CONTROL OF MOTOR STATOR CURRENT WAVEFORM PROFILES

RELATED APPLICATIONS

This application contains subject matter related to copending U.S. application Ser. No. 09/826,423 of Maslov et al., filed Apr. 5, 2001, copending U.S. application Ser. No. 09/826,422 of Maslov et al., filed Apr. 5, 2001, U.S. application Ser. No. 09/966,102, of Maslov et al., filed Oct. 1, 2001, U.S. application Ser. No. 09/993,596 of Pyntikov et al., filed Nov. 27, 2001, U.S. application Ser. No. 10/173,610, of Maslov et al., filed Jun. 19, 2002, and U.S. application Ser. No. 10/290,537, of Maslov et al, filed Nov. 18, 2002, and U.S. application Ser. No. 10/353,075, of Maslov et al., filed Jan. 29, 2003, all commonly assigned with the present application. The disclosures of these applications are incorporated by reference herein.

FIELD OF THE INVENTION

The present invention relates to control of electric motors, more particularly to implementation, individually, of a plurality of motor control schemes to effect associated stator current waveform profiles.

BACKGROUND

The above-identified copending patent applications describe the challenges of developing efficient electric motor drives. Electronically controlled pulsed energization of motor windings offers the prospect of more flexible management of motor characteristics. By control of pulse width, duty cycle, and switched application of an energy source to appropriate stator windings, greater functional versatility can be achieved. The use of permanent magnets in conjunction with such windings is advantageous in limiting current consumption.

In a vehicle drive environment, wherein power availability for a traction motor is limited to an on-board supply, it is highly desirable to attain a high torque output capability at minimum power consumption while maintaining high efficiency in all conditions of traction motor operation. Motor structural arrangements described in the copending applications contribute to these objectives. As described in those applications, electromagnet core segments may be configured as isolated magnetically permeable structures in an annular ring to provide increased flux concentration. Isolation of the electromagnet core segments permits individual concentration of flux in the magnetic cores, with a minimum of flux loss or deleterious transformer interference effects occurring from interaction other electromagnet members.

The above-identified copending U.S. application Ser. No. 10/173,610 describes a control system for a multiphase motor that compensates for variations in individual phase circuit elements. A high degree of precision controllability is obtained with each phase control loop closely matched with its corresponding winding and structure. Successive switched energization of each phase winding is governed by a controller that generates signals in accordance with parameters associated with the respective stator phase components and selected driving algorithms. The phase windings are energized with current of sinusoidal waveform for high efficiency operation. The control system varies the output current to respond to, and accurately track, the user's torque command input.

The sinusoidal current waveform profile obtained with this commutation strategy can extend battery life through efficient operation. However, in vehicle driving operation there may be a need for torque capability in excess of that available from the most efficient control scheme. Typically, the power supply is rated for a maximum current discharge rate, for example, 10.0 amps. If the user of the system requests a torque command that correlates to this maximum current draw, then the motor torque output for a sinusoidal current waveform profile is limited, for example, to approximately 54.0 Nm in a motor with a configuration such as described above. In vehicle drive applications, torque input commands are associated by users with commands for change of speed. In typical driving operation, user torque requests are subject to wide variability with little, if any, long term predictability. A driver may demand higher acceleration or greater speed than the system can accommodate at maximum torque with a sinusoidal current waveform. Driving conditions, such as steep uphill grade or heavy vehicle load or the like, may impose other limitations on available speed and acceleration. Other non-vehicular applications may have similar high torque requirements.

The need thus exists for a vehicle motor control system that is capable of performing with high efficiency yet can deliver increased torque output when required by the user. The above-identified Ser. No. 10/290,537 application addresses this need by making available a plurality of motor control schemes for a motor drive, each of which can provide a unique current waveform profile. One of the motor control schemes may be selected by the user to obtain a current waveform profile that has the greatest capability to meet operating objectives. For example, a control scheme may be selected that yields high efficiency operation, such as a sinusoidal waveform, while another control scheme may be selected that provides higher torque, albeit with less operating efficiency. Selection among motor control schemes may be made in accordance with the user's needs or objectives with respect to torque and efficiency, or other factors, e.g., low torque ripple and noise, etc., at any particular time. A selected motor control scheme will be implemented to generate control signals to produce motor energization current having the associated waveform profile.

In a vehicle traction application, for example, user profile selection provides a vehicle driver flexibility to adjust operation to meet objectives. For example, if the user seeks to reach the destination in minimum time, a high torque profile can be selected and maintained throughout a trip to provide maximum speed and acceleration capability. If, however, a greater concern is to conserve an on-board energy source for a relatively long trip, the high efficiency profile can be selected throughout, possibly with the user's selection of the high torque profile at various points on a limited basis. Reference is made to application Ser. No. 10/290,537 for a more detailed description of exemplified waveforms, particularly high efficiency, sinusoidal waveforms, and high torque, square wave shaped waveforms.

The variable conditions and changing requirements of vehicle operation, however, may call for a change in profile more frequently or rapidly than the driver can, or would desire to, keep pace with. A driver's torque requests may be adequately met with selection of the high efficiency profile mode except for relatively transient instances such as passing situations, uphill grades, etc. In those instances, the driver may not be sufficiently responsive to the changing conditions to obtain optimum advantage of a change in selection from a high efficiency profile to a high torque profile. When the high torque requirement conditions diminish, return to the high efficiency profile may be delayed until the user realizes that the high torque profile is no longer necessary, thus drawing unnecessary current from the battery. Thus, it would be desirable to use the high torque mode only when torque greater than that available from the high efficiency mode is required.

The above identified pending Maslov et al. Ser. No. 10/353,075 application describes a system in which a motor control scheme is automatically selected on a dynamic basis to provide an appropriate energization current waveform profile. The system is responsive to a user input signal that represents a torque request. The user input signal is continually sensed and the ability of the system to meet the torque request is monitored to select the appropriate motor control scheme accordingly. The ability of the system to meet torque request is a function of motor speed, which is also continuously sensed to facilitate the torque demand monitoring function. The high efficiency motor control scheme is implemented unless the corresponding current waveform profile is unable to meet the torque demand. The high torque motor control scheme is implemented only when increased torque demand is needed.

While such a system is adaptive to provide appropriate stator current waveforms to meet system torque demands, other conditions, of which the driver may not be aware, may mitigate against implementation of the high torque motor control scheme. Events not directly related to torque production capability may occur that would indicate that the high efficiency mode is appropriate even during periods of high torque demand. For example, the battery supply voltage may reach a low threshold level that represents an impending need for battery recharge or a replacement. The high efficiency profile mode would delay these requirements. As another example, the motor may be operating at severe load conditions, thereby developing increased heating. Motor temperature may reach a level indicative of the need for low current draw and thus an overriding preference for implementation of the high efficiency profile mode of operation. Other external conditions may also factor into a preference for one or more of a plurality of different stator current waveform profiles.

The need thus remains for a more adaptive system in which a motor control scheme is automatically selected based on a plurality of conditions to provide an appropriate energization current waveform profile.

DISCLOSURE OF THE INVENTION

The present invention fulfills this need by providing a plurality of motor control schemes for a motor drive, each of which can produce a unique motor energization current waveform profile. One or more conditions extrinsic to the motor are sensed continuously throughout motor operation. Such conditions are related to motor operation other than directly sensed motor functions such as position, speed and current feedback parameters. One of the motor control schemes is automatically selected on a dynamic basis to provide motor stator current energization with an appropriate current waveform profile. Selection of a motor control scheme is made in accordance with criteria associated with the monitored conditions as well as with torque requirements. The present invention thus provides additional advantages in motors having ferromagnetically autonomous stator electromagnets.

The motor control schemes may comprise a high efficiency motor control scheme that provides a current waveform profile for relatively optimum operating efficiency and a high torque motor control scheme that provides a current waveform profile for relative high operating torque response. The system is responsive to a user signal that sets a torque command request. The torque request and the ability of the system to meet the torque demand are monitored and the appropriate motor control scheme is selected accordingly. The high efficiency motor control scheme is implemented unless the corresponding current waveform profile is unable to meet the torque demand. If the torque demand exceeds the torque capability of the system when operating in the high efficiency mode, the high torque motor scheme is implemented in the absence of contrary signals generated from the sensing of extrinsic conditions.

Another advantage of the present invention is that one or more system operating conditions can be monitored and compared with criteria that call for use of particular waveform profiles. Motor temperature may be monitored and compared with a particular heat threshold above which the high efficiency motor control scheme is selected for implementation. The power supply voltage may be monitored and compared with a supply voltage threshold level. If the monitored voltage is below this threshold, the high efficiency motor control scheme is selected for implementation. If either of these thresholds is met, the high torque motor control scheme is not selected, regardless of the monitored torque conditions.

An additional advantage of the invention is that the user may be given the option to disengage the automatic profile selection by inputting a manual selection. For example, in a vehicle application a driver may elect to employ the high torque mode throughout operation so that the destination can be achieved as soon as possible.

The present invention may be manifested in a control system for a multiphase motor having a plurality of stator phase components, each stator phase component comprising a phase winding formed on a core element, and a permanent magnet rotor. Preferably, each of the stator core elements comprises ferromagnetic material separated from direct contact with the other core elements, each stator phase component thereby forming an autonomous electromagnet unit. Stator energization current is provided by a direct current power supply through circuitry coupled to a controller. The controller can access data from profile memory storage for any of a plurality of motor control schemes to implement stator energization current having a corresponding waveform profile. Using the accessed data, the controller generates control signals that are applied to energization circuitry for supplying current to the phase windings with a particular current waveform profile in accordance with the selected motor control scheme. Each motor control scheme provides motor driving current that corresponds to torque command signals received at the controller input terminal. The energization circuitry may comprise a plurality of controllable switches having control terminals coupled to the controller via pulse width modulation, such as described in the '041 Maslov application, identified above.

The controller is dynamically responsive to one or more monitored conditions to effect selection of the motor control schemes. The stored motor control schemes are determinative of the current waveform profiles and, when accessed, are incorporated into controller operation. A user input, coupled to the controller, provides a torque command signal, the controller deriving therefrom a torque demand. The controller preferably is provided with additional inputs, including motor operational feedback signals such as speed, rotor position, stator current and the like, and signals indicative of extrinsic conditions such as temperature and supply voltage level. If the sensed motor temperature exceeds a temperature threshold or if the sensed power supply voltage level is below a voltage level threshold, data for the high efficiency motor control scheme is accessed from storage for motor control implementation.

In the absence of these conditions, data for the torque motor control scheme is accessed when the torque demand exceeds a torque threshold and data for the high efficiency motor control scheme is accessed when the torque demand does not exceed the torque threshold. The torque threshold is set in dependence on the torque output capacity of the motor for high efficiency motor control operation. As torque output capacity is dependent on speed, the torque threshold is variable. Based on received input signals, the controller can derive the motor torque demands and the control voltages necessary to meet the torque demands on a real time basis. If the voltage required to sustain sinusoidal waveform profile mode exceeds the power supply voltage, then the controller selects the high torque profile mode operation, accessing the data therefor from the profile memory. As an alternative to repeated real time calculation for profile selection, a lookup table that correlates profile selection with torque request input and monitored speed may be stored in memory.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
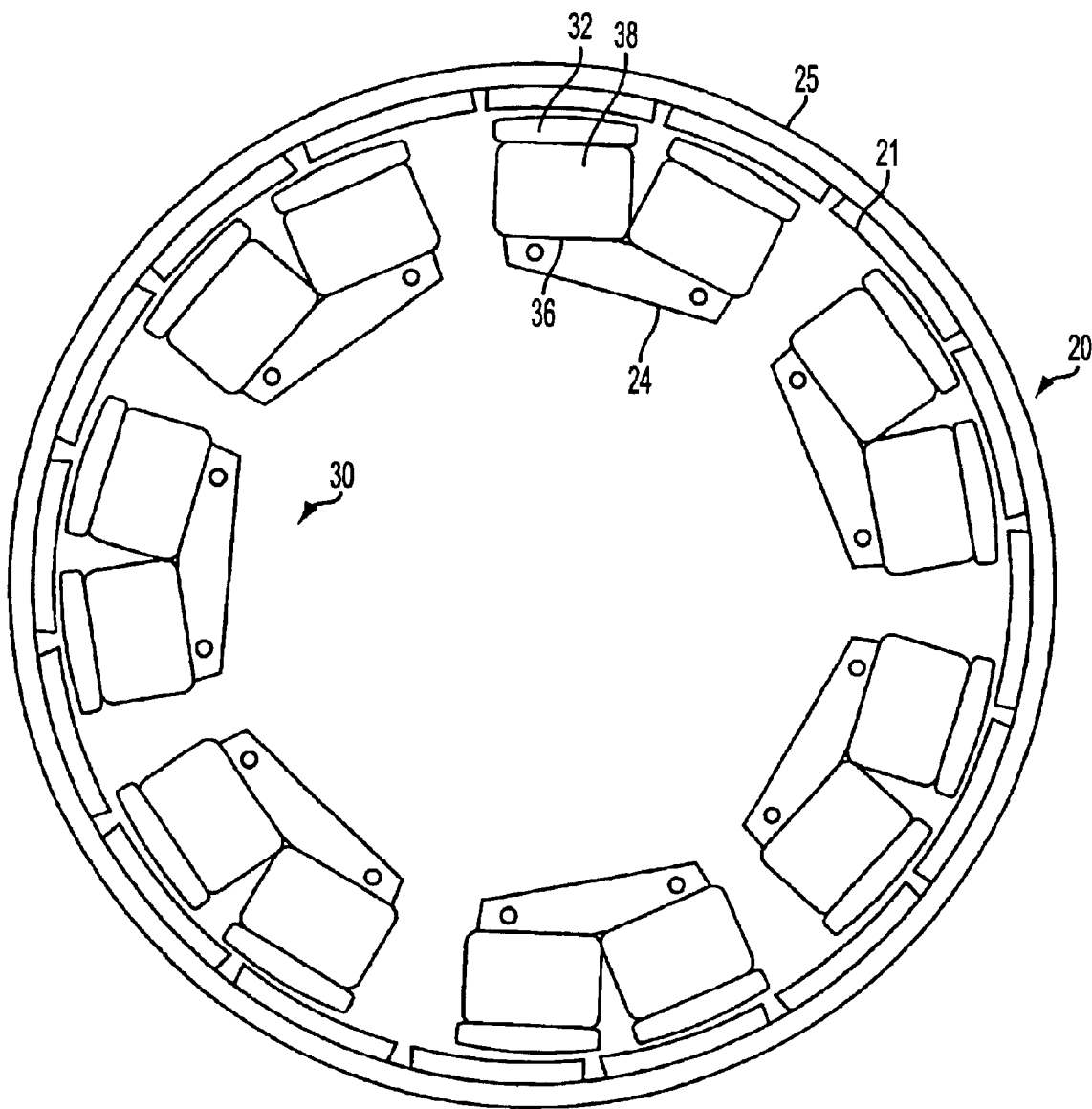
FIG. 1 is an exemplary view showing rotor and stator elements in a configuration that may be employed in the present invention.

The present invention is applicable a motor such as disclosed in the copending Maslov et al. application Ser. No. 09/826,422, although the invention can be used with various other permanent magnet motors. FIG. 1 thus is an exemplary view showing rotor and stator elements as described in that application, the disclosure of which has been incorporated herein. Rotor member 20 is an annular ring structure having permanent magnets 21 substantially evenly distributed along cylindrical back plate 25. The permanent magnets are rotor poles that alternate in magnetic polarity along the inner periphery of the annular ring. The rotor surrounds a stator member 30, the rotor and stator members being separated by an annular radial air gap. Stator 30 comprises a plurality of electromagnet core segments of uniform construction that are evenly distributed along the air gap. Each core segment comprises a generally U-shaped magnetic structure 36 that forms two poles having surfaces 32 facing the air gap. The legs of the pole pairs are wound with windings 38, although the core segment may be constructed to accommodate a single winding formed on a portion linking the pole pair. Each stator electromagnet core structure is separate, and magnetically isolated, from adjacent stator core elements. The stator elements 36 are secured to a non-magnetically permeable support structure, thereby forming an annular ring configuration. This configuration eliminates emanation of stray transformer flux effects from adjacent stator pole groups. The stator electromagnets are thus autonomous units comprising respective stator phases. The concepts of the invention, more fully described below, are also applicable to other permanent magnet motor structures, including a unitary stator core that supports all of the phase windings.

Figure 2:
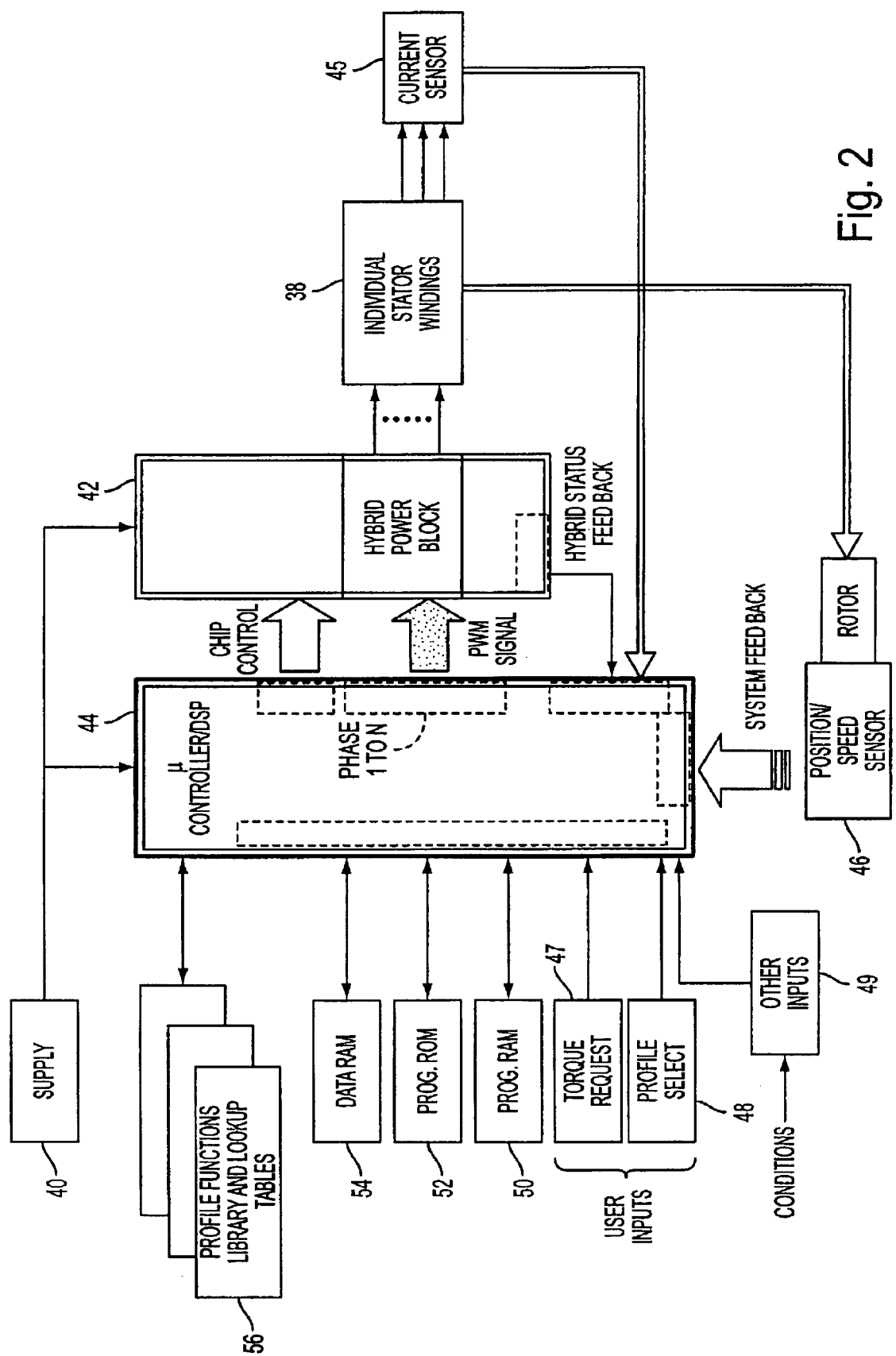
FIG. 2 is a block diagram of a motor control system in accordance with the present invention.

FIG. 2 is a block diagram of a motor control system in accordance with the present invention. A plurality of multiphase motor stator phase windings 38 are switchably energized by driving current supplied from d-c power source 40, such as a battery, via hybrid power block 42. The power block may comprise electronic switch sets that are coupled to controller 44 via a pulse width modulation converter and gate drivers. Each phase winding is connected to a switching bridge having control terminals connected to receive pulse modulated output voltages from the controller. Alternatively, the switching bridges and gate driver components may be replaced by amplifiers linked to the controller output voltages. Reference is made to the above identified application Ser. No. 10/290,537 for a more detailed description of the winding power circuitry.

Current in each phase winding is sensed by a respective one of a plurality of current sensors 45 whose outputs are provided to controller 44. The controller may have a plurality of inputs for this purpose or, in the alternative, signals from the current sensors may be multiplexed and connected to a single controller input. Rotor position and speed sensor 46 provides rotor position and speed feedback signals to the controller. The sensor may comprise a well known resolver, encoder or their equivalents and a speed approximator that converts the position signals to speed signals in a well known manner. The controller is connected to the supply 40 by a primary power supply bus. The controller is also provided with user inputs, including a torque request input 47 and a profile selection input 48, and other inputs 49 received from sensed extrinsic conditions such as motor temperature and battery voltage.

Coupled to the controller are program RAM memory 50, program ROM 52, DATA RAM 54 and profile memory 56. These illustrated units are merely representative of any well known storage arrangements by which the controller may access stored random data and program data. Profile memory 56 is shown separately in the drawing for purposes of illustration of the inventive concepts. The profile memory may comprise a ROM in which are stored the portions of the motor control scheme programs that dictate the motor current waveform profiles obtained with implementation of the associated control schemes. The profile memory data may be stored in the form of a profile functions library and lookup tables. The profile memory data structure can be in a form of real-time calculations and optimization routines. As an alternative, or in addition, to ROM, a unit can be provided that calculates values during real-time motor operation.

In the vehicle drive application example, the torque request input 47 represents torque required by the driver's throttle. An increase in throttle is indicative of a command to increase speed, which can be realized by an increase in torque. Alternatively, it may be indicative of a command to increase torque in order to maintain the same speed of a vehicle under heavy load conditions, such as uphill driving. In operation, the control system torque tracking functionality should maintain steady state torque operation for any given torque request input through varying external conditions, such as changes in driving conditions, load gradient, terrain, etc., and should be responsive to changes at the torque request input to accommodate the driver's throttle commands. The manner in which the control system responds to torque input requests is dependent upon the particular motor control scheme implemented. A plurality of motor control schemes are available to obtain an appropriate response. Each control scheme effects a particular motor current waveform profile having unique characteristics with respect to efficiency, torque capacity, response capability, power losses, etc.

Figure 3:
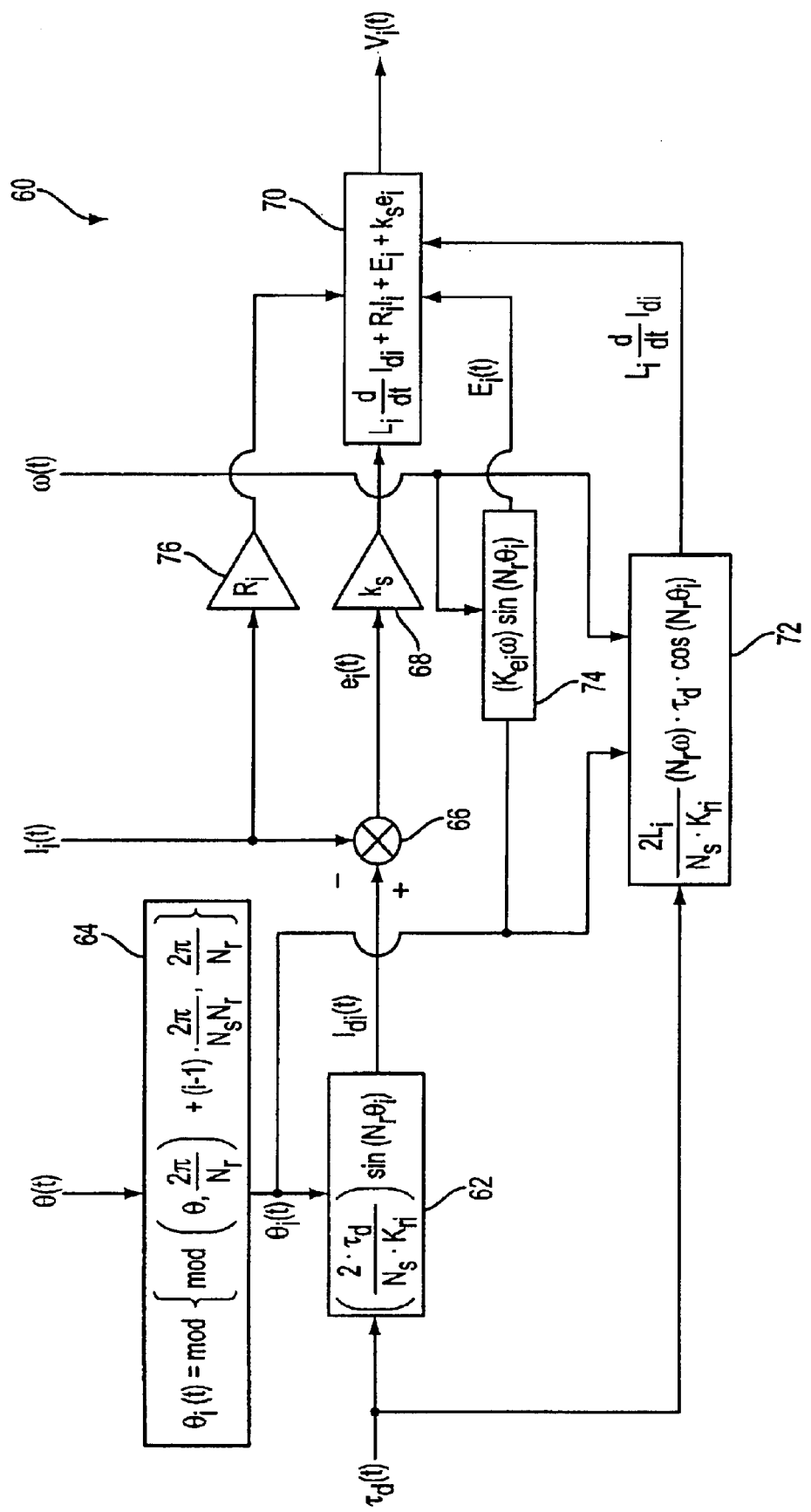
FIG. 3 is a block diagram that illustrates torque controller methodology for use in the control system of FIG. 2.

FIG. 3 is a block diagram that illustrates a motor control scheme utilized in the copending Ser. No. 10/173,610 application identified and incorporated herein above. Reference is made to that application for detailed description of operation. In order to develop the desired phase currents the following per-phase voltage control expression is applied to the driver for the phase windings:

$$V_i(t) = L_i dI_{di}/dt + R_i I_i + E_i + k_s e_i$$

FIG. 3 represents the methodology, generally indicated by reference numeral 60, by which the controller derives the components of this voltage expression in real time, utilizing the torque request input and the signals received from phase current sensors, position sensor and speed detector. Functional block 70 represents the formulation and addition of the components of the above expression to obtain the control voltage in real time. Each of the functional blocks 62, 64, 66, 68, 72, 74 and 76, shown as inputs to block 70, represents the generation of the various elements of the components obtained from real time inputs received by the controller or parameter constants. Block 62 represents a precision torque tracking functionality, the per-phase desired current trajectories being selected according to the following expression:

$$I_{di} = \left(\frac{2\tau_d}{N_s K_{\tau i}}\right) \sin(N_r \theta_i)$$

where $I_{di}$ denotes per-phase desired current trajectory, $\tau_d$ denotes the user's requested torque command, $N_S$ represents the total number of phase windings, $K_{\tau i}$ denotes a per-phase torque transmission coefficient and $\theta_i$ represents rotor position for the $i^{th}$ phase. The per-phase current magnitude is dependent upon the per-phase value of the torque transmission coefficient $K_{\tau i}$.

In operation, controller 44 successively outputs control signals $V_i(t)$ to the hybrid power block for individual energization of respective phase windings in a sequence established in the controller. Each successive control signal $V_i(t)$ is related to the particular current sensed in the corresponding phase winding, the immediately sensed rotor position and speed, and also to model parameters, $K_{ei}$ and $K_{\tau i}$, that have been predetermined specifically for the respective phases. The computations illustrated in FIG. 3 are performed successively in real time. The expression shown in block 62 in this motor control scheme provides the desired current component for the tracking torque output control signal $V_i(t)$ with a sinusoidal waveform profile. The sine wave current trajectory $I_{sin}(t)$ is generated from the following equation $$I_{sin} = I_m \sin(N_r \theta_i)$$

where $I_m$ denotes the phase current magnitude, $N_r$ denotes the number of permanent magnet pairs and $\theta_i$ denotes the measured per phase rotor position signal. As described in the above identified copending Maslov et al. applications (Ser. No. 10/290,537 and '041), this sinusoidal current waveform profile provides efficient motor operation.

Different expressions for block 62 can be used for the torque tracking functionality of FIG. 3 to obtain different current waveform profiles for manifesting other operational aspects, although sacrificing some of the efficiency achieved with the sinusoidal waveform profile. For higher torque operation, the expression of block 62 shown in FIG. 3 can be replaced with an expression yielding a square wave current waveform trajectory $I_{sq}(t)$, such as $$I_{sq} = I_m \, sgn(\sin(N_r \theta_i))$$

where sgn (x) denotes the standard signum function and is defined as 1 if x>0, 0 if x=0, and −1 if x<0. Reference is again made to the copending Maslov et al. applications (Ser. No. 10/290,537 and '041) for a more detailed description comparing the efficiency and torque features of the two different current waveform profiles obtained from the motor control schemes discussed above.

Profile memory 56 stores data that are used by the controller to obtain the current values that satisfy the expressions exemplified above. For the square wave profile, the expression $L_i dI_{di}/dt$ may be prestored. The data may be stored as lookup tables in a profile functions library, each motor control scheme having a corresponding lookup table. Each entry in a lookup table represents a value of current, shown as the output of block 62 in FIG. 3, for a particular combination of torque request value and rotor position for the corresponding motor control scheme. If a control scheme is selected for which the sinusoidal waveform is produced, the corresponding profile memory data is accessed. Square wave profile memory data would be accessed if the corresponding control scheme is selected. Alternatively, the profile memory may store data for each profile with which the desired current value $I_{di}$ is repeatedly computed by the controller in real time. While expressions for sinusoidal and square wave waveforms have been set forth above for purposes of illustration, other waveform profiles, such as sawtooth, etc., may be utilized for different operational purposes.

Figure 4:
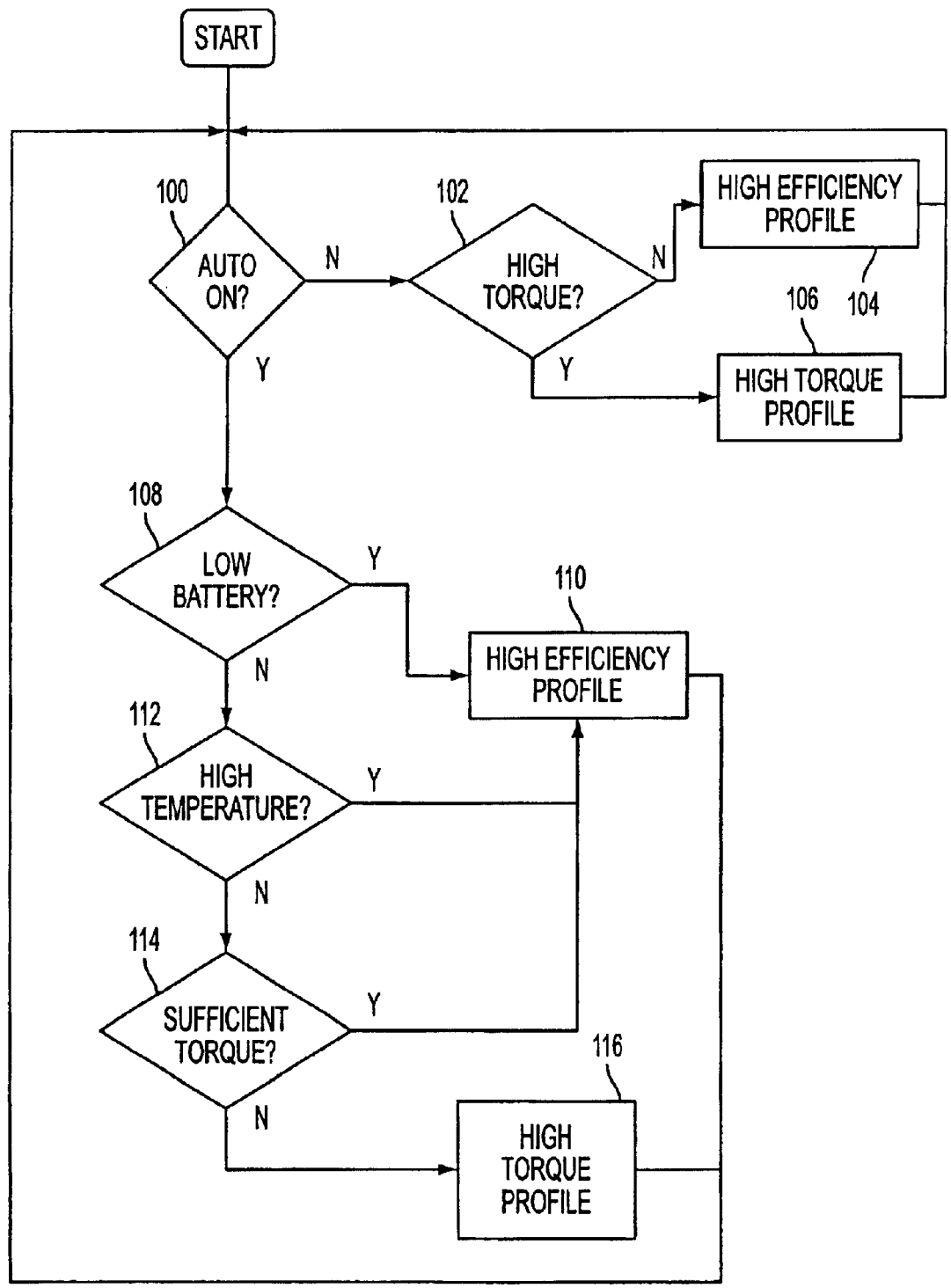
FIG. 4 is a flow chart for operation of the profile selection functionality in accordance with the present invention.

Selection of profile data can be made by the controller automatically as appropriate during motor operation. Alternatively, a user can select an operational mode corresponding to one of the profiles by inputting a profile selection signal at controller input 48. Profile selection operation is described with reference to the flow chart shown in FIG. 4. The description pertains to a specific example in which the profile memory contains data for implementing a high efficiency profile motor control scheme, such as a control scheme for producing a sinusoidal motor current waveform and for implementing a high torque profile, such as a control scheme for producing a square wave motor current waveform. This example is merely illustrative, as data for other profiles may be stored in the profile memory and accessed under operating conditions for which different current waveforms are appropriate.

In the absence of a profile select signal detected by the controller, an automatic profile selection mode is invoked. At step 100, the controller detects whether a user profile selection signal has been received at input 48 to determine whether the automatic mode is to be invoked. If the determination in step 100 is negative, the controller determines at step 102 whether the received profile select signal is a high torque profile selection. If not, the controller, after any appropriate delay, accesses the profile memory to retrieve data from the high efficiency profile lookup table at step 104. The retrieved data yields the desired current value $I_{di}$ for the instantaneous values of the torque request and the sensed rotor position levels. If, instead, the high torque profile has been selected, as determined in step 102, the corresponding lookup table is accessed at step 106 and the appropriate value of $I_{di}$ for this table is obtained. The process flow from both steps 104 and 106 returns to step 100 for determination of whether there is still a user profile selection received and the nature of such selection to continue in the above described manner. Operation at steps 104 and 106 occurs after the selection in step 102 for a period sufficiently long to overcome transient effects in profile changeover. Thus, an appropriate delay for return of the process flow to step 100 may extend for a number of successive feedback samplings.

If no user profile selection input signal is present and the system has not been switched off, the controller determines at step 100 that the waveform profile is to be automatically selected. At step 108, the controller compares the sensed battery voltage, received as a signal at input 49, and compares the voltage level with a predetermined voltage threshold level. If the battery voltage is lower than the threshold level, after any appropriate delay the controller selects the high efficiency mode and accesses the profile memory to retrieve data from the high efficiency profile lookup table at step 110. A delay would be appropriate if it is required to switch between motor control schemes. While operating in this mode, process flow at regular intervals returns to step 108 to continue comparison of a sampled battery voltage with the voltage threshold level. If the battery voltage is determined at step 108 to be above the threshold level, the controller compares the sensed motor temperature, received as a signal at input 49, and determines whether it exceeds a predetermined temperature level at step 112. If the temperature is determined to be high in step 112, the high efficiency mode is indicated and the process flow returns to step 110. If the motor temperature is within an acceptable level, the flow proceeds to step 114 wherein it is determined by the controller whether the torque capacity of the motor, in the high efficiency mode implementation, is sufficient to meet the demand imposed by the user's torque input request for the current motor speed. As more fully described in the copending Maslov et al. application ('041), the motor torque capacity can be determined by comparing the required controller output voltage with the power supply voltage. The torque demands can be met if the derived control voltages, made with reference to the value of the controller $V_r(t)$ from the output of block 70, do not exceed the voltage level of the power supply. The computation of the required voltage, as well as the comparison, can be performed on a real time basis by the controller for each input sampling. Alternatively, a lookup table can be accessed that correlates torque capacity with torque request and motor speed.

If it is determined in step 114 that the torque capacity is sufficient, flow proceeds to step 110, either to continue operation with the high efficiency profile or, with appropriate delay, switch from another control scheme to select the high efficiency motor control scheme and access the corresponding data from the profile memory for implementation. If the controller determines at step 114 that the high efficiency motor control scheme cannot meet the torque demand, then after any appropriate delay the controller the high torque motor control scheme is selected and data therefor retrieved from the profile memory. During operation in the high torque mode, the process, at regular intervals returns to step 100 to continue determination of profile selection.

It is apparent from the above description that the motor control system of the present invention is adaptive to the demands of the user as well as to extrinsic conditions of which the user may not be aware. The system provides operation with highest torque capacity only when necessary to address extreme demands and then only when external motor conditions are favorable.

In this disclosure there is shown and described only preferred embodiments of the invention and but a few examples of its versatility. It is to be understood that the invention is capable of use in various other combinations and environments and is capable of changes or modifications within the scope of the inventive concept as expressed herein. For example, various other current waveform profiles may be utilized. The profile memory thus may store a plurality of profiles accessible by the controller in response to receipt of specific profile selection commands. In another modification, the determination of torque capability determination can be made with respect to the actual supply voltage, rather than nominal supply voltage, with each controller input sampling.

What is claimed is:

1. A method for controlling a motor having a plurality of stator windings coupled to a controller, said method comprising the steps of:

storing a plurality of motor control schemes, each stored motor control scheme effecting a respective stator current waveform profile;

generating control signals in response to a motor operating function to energize the stator windings with a current waveform profile corresponding to a first one of the motor control schemes;

monitoring a condition extrinsic to the motor;

sensing when the condition monitored in the monitoring step meets or exceeds a threshold;

selecting a second one of the stored motor control schemes in response to the sensing step; and generating motor control signals in accordance with the motor control scheme selected in the selecting step to energize the stator windings with a current waveform profile corresponding to the second motor control scheme.

2. A method as recited in claim 1, wherein the stored motor control schemes comprise an efficiency motor control scheme that provides a current waveform profile for relatively optimum operating efficiency and a high torque motor control scheme that provides a current waveform profile for relative high operating torque response.

3. A method as recited in claim 2, wherein the relatively optimum operating efficiency current waveform profile has a substantially sinusoidal waveshape and the relatively maximum torque response current waveform profile has a substantially rectangular waveshape.

4. A method as recited in claim 3, wherein the monitored condition is motor temperature and the selecting step comprises selecting the efficiency motor control scheme when the monitored motor temperature exceeds a heat threshold.

5. A method as recited in claim 3, wherein the monitored condition is motor supply voltage and the selecting step comprises selecting the efficiency motor control scheme when the monitored supply voltage is below a voltage threshold level.

6. A method as recited in claim 3, wherein the monitoring step further comprises continuously monitoring a plurality of conditions including motor temperature and motor supply voltage and the selecting step comprises selecting the efficiency motor control scheme when the sensing step senses that the monitored motor temperature exceeds a heat threshold or that the monitored supply voltage is below a voltage threshold level.

7. A method as recited in claim 6, further comprising the step of inputting a user signal to the controller and wherein the monitoring step further comprises monitoring torque demand; and the selecting step comprises selecting the torque motor control scheme when the sensing step senses that the torque demand exceeds a torque threshold in the absence of attainment of the heat threshold for monitored motor temperature or voltage threshold level for monitored supply voltage.

8. A method as recited in claim 1, wherein the motor comprises:

a stator having a plurality of ferromagnetically autonomous electromagnets, each electromagnet having wound thereon one of the windings; and a permanent magnet rotor.

9. A motor control system comprising:

a motor having a plurality of stator windings;

energization circuitry for providing energization current to the stator windings from a power supply;

a controller coupled to the energization circuitry;

storage means coupled to the controller, the storage means having stored therein a plurality of different motor control schemes, each scheme, when applied by the controller, effecting a respective one of a plurality of motor stator energization current waveform profiles; and condition sensing means coupled to the controller for sensing at least one condition extrinsic to the motor;

wherein the controller is dynamically responsive to the condition sensing means to access the motor control schemes from the storage means to energize the motor stator windings with corresponding current waveform profiles in accordance with criteria associated with sensed conditions.

10. A motor control system as recited in claim 9, wherein said stored motor control schemes comprise an efficiency motor control scheme that provides a current waveform profile for relatively optimum operating efficiency and a torque motor control scheme that provides a current waveform profile for a relative high operating torque response.

11. A motor control system as recited in claim 10, wherein the relatively optimum operating efficiency current waveform profile has a substantially sinusoidal waveshape and the relatively maximum torque response current waveform profile has a substantially rectangular waveshape.

12. A motor control system as recited in claim 11, wherein the motor comprises:

a stator having a plurality of ferromagnetically autonomous electromagnets, each electromagnet having wound thereon one of the windings; and a permanent magnet rotor.

13. A motor control system as recited in claim 10, wherein the condition sensing means comprises a motor temperature sensor; and wherein the efficiency motor control scheme is accessed when sensed motor temperature exceeds a temperature threshold.

14. A motor control system as recited in claim 10, wherein the condition sensing means comprises a voltage level detector; and wherein the efficiency motor control scheme is accessed when sensed power supply voltage level is below a voltage level threshold.

15. A motor control system as recited in claim 14, wherein the condition sensing means comprises a motor temperature sensor; and wherein the efficiency motor control scheme is accessed when sensed motor temperature exceeds a temperature threshold, regardless of the torque demand.

16. A motor control system as recited in claim 14, wherein the condition sensing means comprises a voltage level detector; and wherein the efficiency motor control scheme is accessed when sensed power supply voltage level is below a voltage level threshold, regardless of the torque demand.

17. A motor control system as recited in claim 10, further comprising a user torque command input coupled to the controller and means for deriving therefrom a motor torque demand; and wherein the torque motor control scheme is accessible when the torque demand exceeds a torque threshold and the efficiency motor control scheme is accessible when the torque demand does not exceed the torque threshold.

18. A motor control system as recited in claim 17, wherein the condition sensing means further comprises a motor temperature sensor and a voltage level detector and wherein the efficiency motor control scheme is accessed when sensed motor temperature exceeds a temperature threshold or when sensed power supply voltage level is below a voltage level threshold, regardless of torque demand.

19. A motor control system as recited in claim 18, further comprising a user profile selection input to the controller; and wherein the controller is responsive to receipt of a command at the user profile selection input to access a corresponding motor control scheme and to disregard sensed motor temperature and sensed power supply voltage.

* * * * *